United States Patent [19]

Greider

[11] Patent Number: 4,557,710
[45] Date of Patent: Dec. 10, 1985

[54] CLUTCH CONTROLLED DRIVE UNIT

[76] Inventor: C. Austin Greider, 3923 E. 28th St., Des Moines, Iowa 50317

[21] Appl. No.: 584,234

[22] Filed: Feb. 27, 1984

[51] Int. Cl.⁴ ............................................. F16H 7/14
[52] U.S. Cl. ................... 474/118; 474/119; 474/121; 474/133; 474/139
[58] Field of Search ............ 474/118, 119, 121, 133, 474/139

[56] References Cited

U.S. PATENT DOCUMENTS

| | | | |
|---|---|---|---|
| 2,827,804 | 3/1958 | Wolfenden et al. | 474/121 X |
| 4,036,070 | 7/1977 | Knight | 474/119 |
| 4,324,552 | 4/1982 | Boushek et al. | 474/118 |
| 4,457,086 | 7/1984 | Bacon | 474/118 |

Primary Examiner—James A. Leppink
Assistant Examiner—Frank McKenzie
Attorney, Agent, or Firm—G. Brian Pingel; Kent A. Herink

[57] ABSTRACT

A drive unit preferably employed with a self-propelled lawn mower for driving at least one pair of wheels of the mower. An axle pulley is fixed on the axle of the drive wheels and a directional pulley is rotatably mounted above and in a spaced apart relation to the axle pulley. A drive belt is trained over an upper portion of the directional pulley and about a lower portion of the axle pulley and is then trained about an upper portion of a directional roller. The drive unit has a drive condition and an idle condition in which a portion of the drive belt, between the directional roller and the axle pulley, is in a generally vertical run. An idler roller is mounted on lever arms having an axis of rotation coaxial with that of the directional roller and is positioned below and in a spaced apart relationship to the directional roller so that when the lever arms are pivoted about their axis, the idler roller engages the drive belt and increases the contact between the drive belt and the axle pulley to place the drive unit into an operating condition.

9 Claims, 6 Drawing Figures 4,557,710

CLUTCH CONTROLLED DRIVE UNIT

BACKGROUND OF THE INVENTION

1. Field of the Invention

The present invention relates in general to belt and pulley type drive units and more specifically to such units that are employable with self propelled rotary mowers guided by a user via a handle located at the rear of the mower and have included a clutch control means for actuating the self-propelling action of the mower.

2. Description of the Prior Art

A large variety of self-propelled lawn mowers having belts and pulley drive units known in the art. Generally, such mowers are either of a rider variety whereby the user of the mower sits upon and is supported by the mower or of a variety that includes a handle at the rear by which the mower is guided by a user that walks behind the mower. In the latter variety, it is typical for the handle to include an actuation means that can be controlled by a user without stooping or bending to actuate the self-propelled mechanism of the mower. Such actuation mechanisms normally consist of a lever and operating cable that transmits an actuating force over several feet to a clutch control assembly of the drive unit of the self-propelled mechanism.

In the past, it has been difficult to provide a self-propelled mower having a drive unit with a clutch control assembly actuating means that can be operated with the application of relatively small pressure and at the same time provide a wheel driving action with relatively no slippage or wasted action in the drive unit. The reason for this deficiency in prior art units is that there previously has been an inverse relationship between actuation pressure and drive unit slippage. In other words, drive units having a low pressure actuation system normally also have relatively high slippage in the drive system and vice versa. Also, prior drive units normally were located beneath the deck of their associated mower and required special shielding to protect them from their environments.

The present invention is directed to overcome the above deficiencies with prior art units and provides a self-propelled lawn mower having a drive system with a clutch control assembly that can be actuated with relatively low pressure exerted thereon and yet has essentially no slippage or wasted motion and also a drive system that is substantially above the deck of its associated mower.

SUMMARY OF THE INVENTION

The present invention provides a drive unit for at least one pair of wheels of a self-propelled lawn mower having a main frame with front and rear ends and opposite sides, an engine mounted on the main frame and having a power take off shaft on which an engine pulley is fixed. A wheel axle journaled at the opposite sides of the main frame connects between the drive wheels and has an axle pulley fixed thereon. The engine pulley is connected directly to a wheel drive mechanism through a drive belt when a clutch control assembly of the mower drive unit is engaged to power the drive wheels.

The clutch control assembly includes a directional pulley that is mounted from the main frame generally above and in a spaced apart coplanar relationship to the axle pulley, and a directional roller that is mounted from the main frame in a position intermediate the directional pulley and the axle pulley. The directional roller is associated with a pair of lever arms rotatably mounted from the main frame. An idler roller is mounted on the lower end of the lever arms and is positioned below and in a spaced apart relationship to the directional roller.

The drive belt has an idle condition and a drive condition and is trained about the engine pulley, directional pulley, axle pulley and directional roller when in its idle condition. Means are associated with the lever arms for exerting a pivoting force on at least one of the lever arms to rotate the idler roller into engagement with the drive belt, thereby increasing the amount of contact the belt has with the axle pulley to place the drive belt in a drive condition.

In a preferred embodiment, the peripheries of the directional roller and pulley are in fixed adjacent relationship to one another. In this way, the directional pulley serves as a guide for the drive belt to prevent it from disengaging with the directional roller.

DETAILED DESCRIPTION OF THE INVENTION

Figure 1:
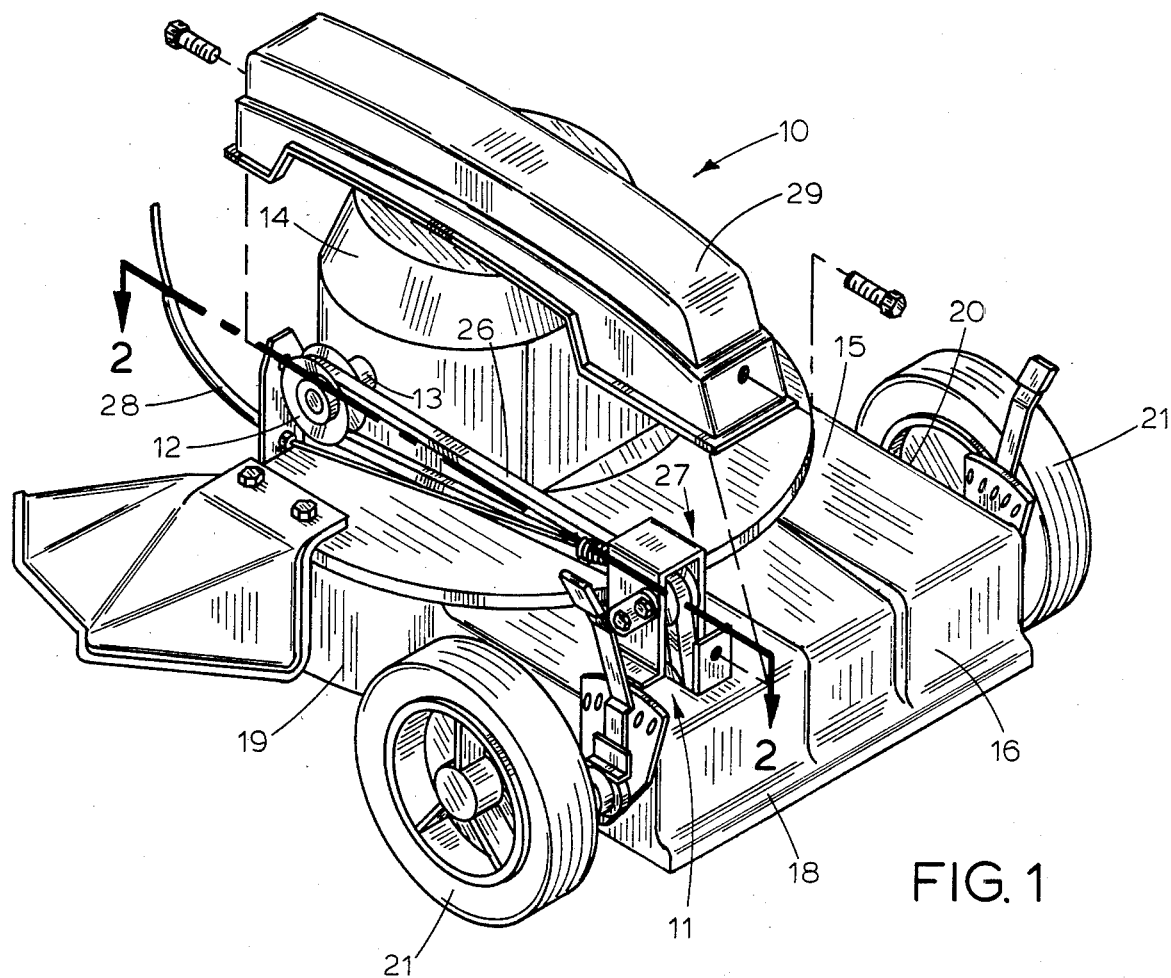
FIG. 1 is a partially exploded front side perspective of a self-propelled lawn mower having a preferred embodiment of a drive unit of the present invention located beneath a cover that has been raised for purposes of illustration.

The drive unit of the present invention will now be described with reference to the drawings. Referring first to FIG. 1, a self-propelled lawn mower 10, that is partially shown, incorporates a belt and pulley type drive unit 11 of the present invention. Preferably, the drive unit 11 will generally be employed with self-propelled rotary lawn mowers, such as the mower 10, that are guided by an operator who walks behind the mower. However, the drive unit 11 may also be advantageously employed in other applications wherein it is desired to transmit a driving force to a pulley driven at relatively low revolutions per minute (1,000 or less) and yet do so with substantially no slippage and little wear with respect to an associated drive belt.

The drive unit 11 includes a drive pulley 12 fixed in place on an outer end of a power takeoff shaft 13 of the mower 10. The takeoff shaft 13 is driven by a gas or electric engine (not shown) which is enclosed by an engine shroud 14 mounted on a deck 15 of a main frame 16. Also included in the main frame 16, are a front end 18, a rear end (not shown) and opposite side portions 19 and 20, all of which are associated with the deck 15 in unitary fashion. Preferably, the main frame 16 is supported in an off-the-ground position by a front pair of wheels 21 and a rear pair of wheels (not shown). In the mower 10, the front wheels 21 preferably are the drive wheels of the unit 11 and are interconnected to one another by a drive shaft 22 (shown only in FIGS. 3, 4 and 5). If necessary for reducing the drive speed of the wheels 21 with respect to the drive shaft 22, gear reduction units such as are known in the art may be used to interconnect the drive shaft 22 with the wheels 21. As also shown in FIGS. 3, 4 and 5, an axle pulley 25 is fixed on the drive shaft 22 and a standard type V-belt 26 is employed to transmit drive power from the drive pulley 12 directly to the axle pulley 25 without the need for interposing a gear reduction unit therebetween.

Figure 2:
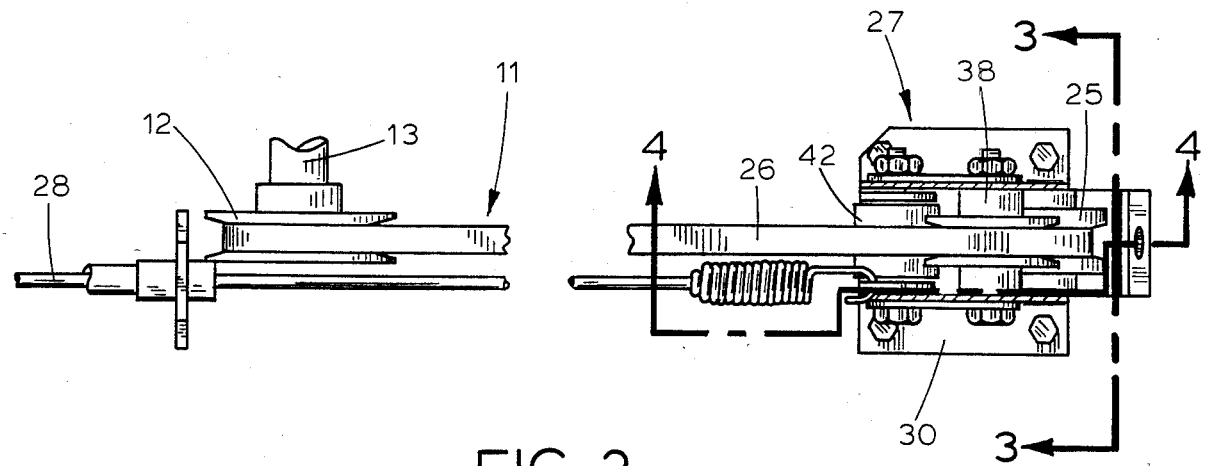
FIG. 2 is a top view of the drive unit of FIG. 1 showing a clutch control assembly thereof.
Figure 4:
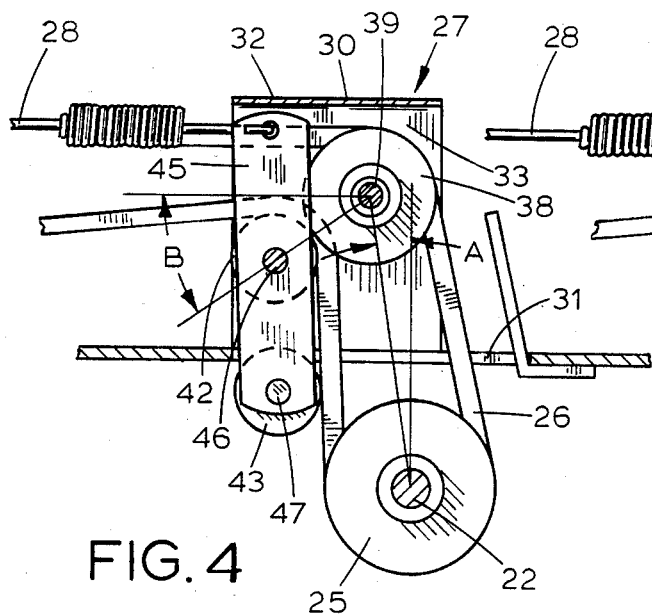
FIG. 4 is a sectional view taken along the line 4—4 of FIG. 2 showing a side view of the front portion of the drive unit shown in FIG. 3 and with the clutch assembly in a nonactuated position.
Figure 5:
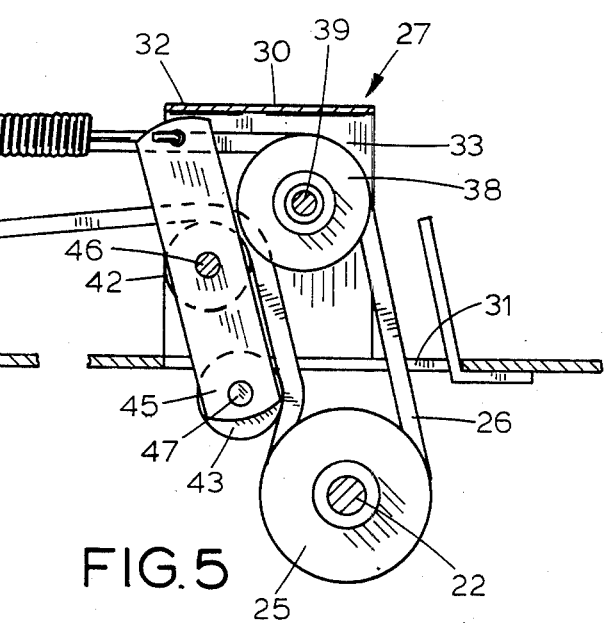
FIG. 5 is a sectional view similar to that of FIG. 4 but with the drive unit clutch control assembly shown in an activated condition.

Referring to FIGS. 1 and 2, the drive unit 11 incorporates a clutch control assembly 27 that is actuable by the operator via a standard "dead man" control that is connected to an operating cable (only a portion of which are shown in FIGS. 1, 4 and 5 at 28) to engage and disengage the unit 11. The belt 26 extends from the drive pulley 12 and is trained about the clutch control assembly 27 and the axle pulley 25 as will be described below. For purposes of safety and appearance, the portions of the drive unit 11 seen in FIG. 1 are normally enclosed by a removable cover 29.

As best shown in FIGS. 3–6, an inverted "U"-shaped sleeve type bracket housing 30 is secured to the top of the frame deck 15 with the open end of the housing 30 in alignment with a lateral slot 31 in the deck 15 that is directly over the axle pulley 25.

Figure 3:
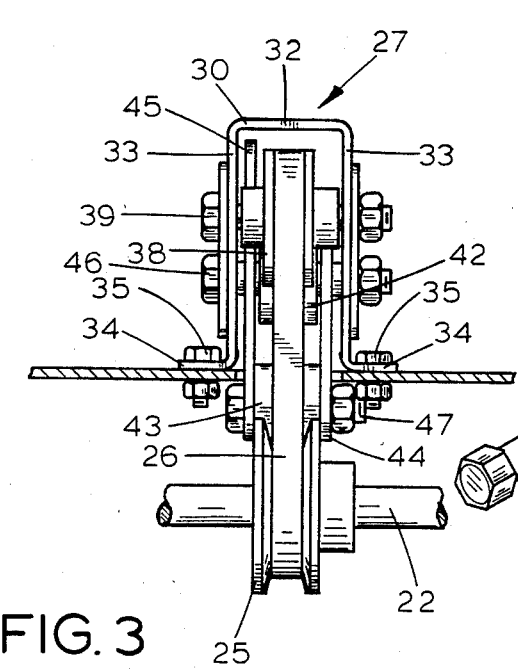
FIG. 3 is a sectional view along the line 3—3 of FIG. 2, showing a front portion of the drive unit of said mower including the clutch control assembly.

The bracket housing 30 has a top 32 and opposite side walls 33 each of which terminate in a flange 34 by which the housing 30 is fixed to the frame deck as by bolts 35 (seen in FIG. 3 only). Disposed in the housing 30 is a directional pulley 38 rotatably mounted on a bolt-like axle 39 (best shown in FIG. 6). Although the axle 39 is parallel to the drive axle 22, preferrably the axle 39 is not directly vertically above the axle 22 but is displaced toward the drive pulley 12 by an angle A (shown only in FIG. 4) that is preferably at least five degrees but no more than twenty degrees with respect to the axle 22 to minimize the amount of the belt 26 that extends beneath the deck 15 for the purposes of protecting the belt from the hazardous conditions existing there. Thus, the pulleys 12, 25 and 38 are positioned with respect to one another such that an angle formed by drawing a line between the axis of the pulleys 12 and 38 and a line between the axis of the pulleys 25 and 38 is preferably greater than 90 degrees but less than 120 degrees. However, these conditions are not essential to the present invention.

Two rollers 42 and 43 are also associated with the housing 30 as well as two lever arms 44 and 45 that are generally of the same shape except that the latter is longer than the former to provide for attachment of the operating cable 28 thereto. The upper roller 42 serves as a directional roller for the drive belt 26 and is rotatably mounted on a bolt type axle 46, similar to the axle 39, as are the lever arms 44 and 45 which are disposed adjacent the bracket housing sidewalls 33. The lower roller 43 serves as an idler roller and is connected with the lower ends of the arms 44 and 45 by means of yet another bolt-type axle 47 so that the lever arms 44 and 45 are rotatable about the axle 46 in unison. Accordingly, when a rearwardly directed pressure is applied on the lever arm 45 by the operating cable 28, both lever arms 44 and 45 together with the idler roller 43 are rotated in a counter clockwise direction about the axle 46.

The axles 46 and 47 and their respective rollers 42 and 43 are arranged parallel to the axle 39, but are positioned toward the drive pulley 12 with respect to the axle pulley 38 so that when the clutch assembly is in an idle condition, peripheral portions of the rollers 42 and 43 are coplanar with a peripheral portion of the pulley 25 so that the portion of the V-belt the rollers 42 and 43 contact is generally in a vertical run. Also, the directional roller 42 is lower than the pulley 38 on an angle B (shown only in FIG. 4) that is preferably thirty degrees but may be larger or smaller than that. In this way, the positioning of the pulleys 25 and 38 and rollers 42 and 43 with respect to one another insures that the drive belt 26 will be trained over greater than fifty percent of the pulley 25. The lever arms 44 and 45 are of a length such that the idler roller 43 has a freedom of movement in a counter clockwise direction to move against the belt 26 to take-up the slack therein when the drive unit 11 is actuated from its idle condition, as shown in FIG. 4, to its operating condition, as shown in FIG. 5. To more fully explain the present invention, a brief description of its operation will now be made.

During idle operation of the drive unit 11, there is sufficient slack in the drive belt so that the drive pulley 12 is not in driving engagement with the belt (FIG. 4). When the dead man control and its associated operating cable 28 are actuated to place the drive unit 11 in an operating condition, the lever arm 44 and 45, as well as the idle roller 43, are rotated in a counter clockwise direction, as shown in FIG. 5. In this way, the roller 43 moves against the belt 26 and exerts a slack take-up pressure thereon to increase the amount of belt portion trained about the pulley 25 and place the drive unit 11 in an operating condition. This dual action of taking up the slack in the belt 26 and also increasing the amount of belt contact with the pulley 25 provides the drive unit 11 with substantially a slip-free operation, but does so without the need for a large actuating force to be supplied by the operating cable 28. Normally, it would not be desirable for a drive unit to have its drive belt change direction in the manner described above, but because of the relatively low RPM of the belt 26, not only is such direction change possible but it is accomplished with relatively little wear on the belt 26 and substantially no wear on the remaining components of the drive unit 11.

Figure 6:
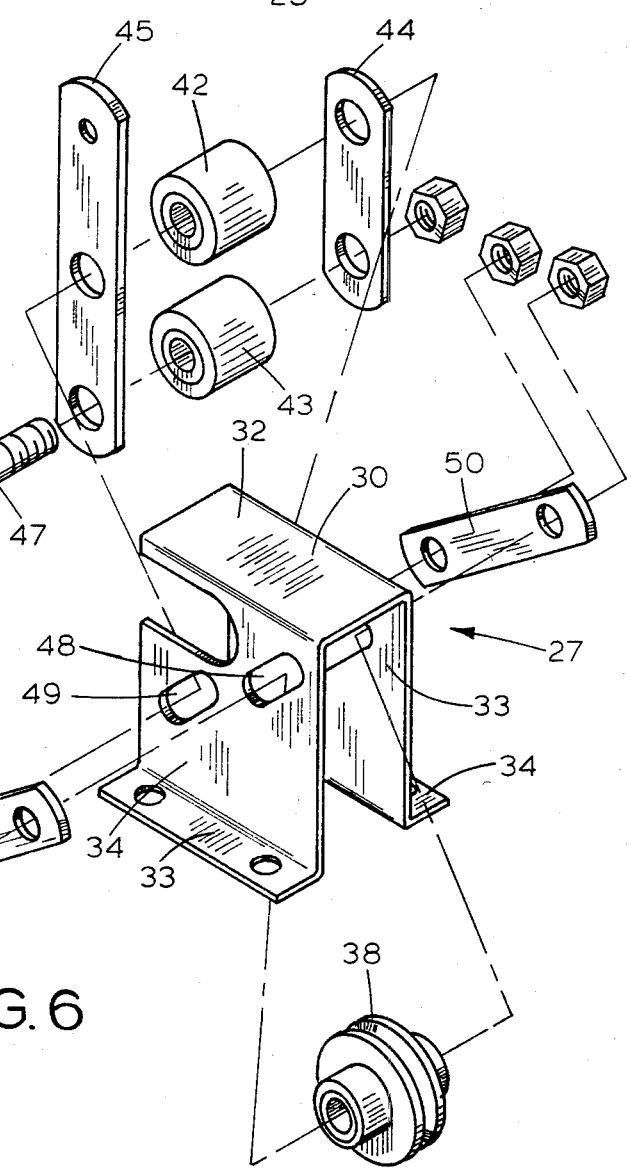
FIG. 6 is an exploded front side perspective view of the clutch control assembly of FIG. 2.

As should be recognized from the above description, the specific distances shown between the pulleys 38 and 25 and the rollers 42 and 43 are not critical to the present invention. Such distances may be varied depending on the amount of the run of the belt 26 between the pulleys 25 and 38, but preferrably should be maintained generally proportionally equal to those shown in the drawings. However, the pulley 38 must be adjustable to take up slack in the drive belt 26 due to wear or for changing the belt. Thus, as shown in FIG. 6, the axle 39 is disposed through inclined slots 48 in the bracket housing sidewalls 33 to permit adjustment of the pulley 38 with respect to the belt 26. It is also highly advantageous for the pulley 38 to be adjacent the directional roller 42 so that the rim of the pulley 38 serves as a guide for the belt 26 as it travels over the roller 42. To maintain this relationship, the axle 46 is disposed through slots 49 in the housing sidewalls 33, which slots are parallel to the slots 48, and the axles 39 and 46 are connected to one another by links 50 on each side of the housing 30. I claim:

1. A drive unit actuable from an idle condition to an operating condition for transmitting drive power from a drive pulley to a driven pulley remote from said drive pulley, said unit comprising:
(a) said drive pulley is fixed on a drive shaft rotated by a power source;
(b) a directional pulley rotatably mounted generally above and in a spaced apart relation to said driven pulley;
(c) a directional roller rotatably mounted in a position adjacent said directional pulley;
(d) a continuous drive belt trained over an upper portion of said directional pulley, a lower portion of said driven pulley and then an upper portion of said directional roller;
(e) at least one lever arm having an axis of rotation coaxial with that of said directional roller and extending generally parallel to the portion of the drive belt running between said driven pulley and said directional roller;
(f) an idler roller rotatably mounted on said lever arm in a position adjacent said drive belt when said unit is in an idle condition; and
(g) means for exerting a pivoting force on said lever arm to move said idler roller into bearing engagement with said drive belt to take up slack in said drive belt and increase the amount of the driven pulley about which the drive belt is trained to thereby place the drive unit in an operating condition.

2. The unit as recited in claim 1 wherein said directional roller and directional pulley are coplanar and have peripheries adjacent to one another so that the periphery of the directional pulley acts to guide the drive belt trained about said directional roller.

3. The drive unit as described in claim 2 wherein said directional pulley and directional roller are adjustable with respect to said remote pulley and have associated coupling means that maintains the adjacent relationship between said directional pulley and directional roller.

4. A unit actuable from an idle condition to an operating condition for transmitting drive power from a drive pulley to a driven pulley, said unit comprising:
(a) said drive pulley is fixed on a drive shaft rotated by a power source;
(b) said driven pulley is fixed on a shaft that is rotated when said unit is in the operating condition;
(c) a directional pulley rotatably mounted on an axle interposed between said drive and remote pulleys;
(d) a continuous drive belt trained about portions of said drive directional and drive pulleys;
(e) a directional roller rotatably mounted in a position adjacent said directional pulley so that the drive belt is trained over a generally fifty percent portion of said drive pulley;
(f) at least one lever arm having an axis of rotation coaxial with that of said directional roller and extending parallel to the portion of the drive belt running between said drive pulley and said directional roller.
(g) a idler roller rotatably mounted on said lever arm in a position adjacent said drive belt when said unit is in an idle condition; and
(h) means for exerting a pivoting force on said lever arm to move said idler roller into bearing engagement with said drive belt to thereby take up slack in said belt and place said drive unit in an operating condition.

5. A unit actuable from an idle condition to an operating condition for driving at least one pair of wheels of a selfpropelled lawn mower having a main frame with front and rear ends and opposite sides, an engine mounted generally on a center portion of said frame for driving at least one grass cutting blade and having a power takeoff with a power takeoff shaft, said unit comprising:
(a) a drive pulley fixed on said power takeoff shaft;
(b) a wheel axle journaled at said opposite sides of said frame and connecting between said pair of drive wheels near one of the front and rear ends of said frame;
(c) an axle pulley fixed on said wheel axle intermediate said pair of drive wheels;
(d) a clutch control means having:
1. a housing bracket fixed on the upper side of said main frame and having at least two vertically aligned spaced apart sidewalls, each of which lies in a plane parallel to said axle pulley;
2. a directional pulley axle secured at each end in said housing bracket sidewalls in a position parallel to, spaced apart from and generally above said wheel axle;
3. a directional pulley mounted on said directional pulley axle and in a spaced apart relationship to said axle pulley;
4. a directional roller axle secured at each end to said housing bracket sidewalls in a parallel relation to said directional pulley axle in a position intermediate said directional pulley and wheel axles and toward the engine of said mower with respect to said directional and wheel pulleys;
5. a directional roller mounted on said roller axle;
6. first and second spaced apart lever arms that are rotatably mounted on said directional roller axle with each being adjacent opposite side walls of said housing bracket;
7. an idler roller axle spaced apart from and below said directional roller axle intermediate said wheel axle and said directional pulley axle and mounted on said first and second lever arms at a lower end portion thereof; and
8. an idler roller rotatably mounted on said idler roller axle.
(e) a drive belt having an idle condition and a drive condition, which belt in said idle condition is trained about said engine pulley, directional pulley, axle pulley and directional roller and is adjacent said idler roller; and,
(f) means for exerting a force on at least one of said lever arms in the direction of said engine to pivot said idler roller into bearing engagement with said drive belt to increase the amount of contact said belt has with said axle pulley to thereby take up slack in said belt and place said drive unit in an operating condition.

6. A unit actuable from an idle condition to an operating condition for driving at least one pair of wheels of a self-propelled lawn mower having a main frame with front and rear ends and opposite sides, an engine mounted generally on a center portion of said frame for diriving at least one grass cutting blade and having a power takeoff with a power takeoff shaft, said unit comprising:
(a) a drive pulley fixed on said power takeoff shaft;
(b) a wheel axle journaled at said opposite sides of said frame and connecting between said pair of drive wheels near one of the front and rear ends of said frame;

(c) an axle pulley fixed on said wheel axle intermediate said pair of drive wheels;
(d) a sleeve type housing bracket fixed on said main frame and having at least two vertically slipped spaced apart sidewalls, each of which lies in a plane parallel to said axle pulley;
(e) a directional pulley mounted on said pulley bracket above and in a spaced apart parallel relationship to said axle pulley;
(f) a directional roller in a parallel relationship to said directional pulley and mounted on said housing bracket in a position intermediate said directional and axle pulleys and toward the engine of said mower with respect thereto;
(g) first and second lever arms rotatably associated with the axle of said directional roller;
(h) an idler roller spaced apart from and below said directional roller intermediate said axle pulley and said directional pulley and mounted on said first and second lever arms at a lower end portion thereof;
(i) a drive belt having an idle condition and an operating condition, which belt in said idle condition is trained about said engine pulley, directional pulley, axle pulley and directional roller and is adjacent said idler roller;
(j) means for exerting a force on at least one of said lever arms to pivot said idler roller into engagement with said dirve belt to increase the amount of contact said belt has with said axle pulley to thereby take up slack in said belt and place said drive belt in an operating condition;

7. A unit actuable from an idle condition to an operating condition for driving at least one pair of wheels of a self-propelled lawn mower having a main frame with front and rear ends and opposite sides, an engine mounted on said frame for driving at least one grass cutting blade and having a power takeoff with a power takeoff shaft, said unit comprising:

(a) a drive pulley fixed on said power takeoff shaft;
(b) a wheel axle journaled at said opposite side of said frame and connecting between said pair of drive wheels near one of the front and rear ends of said frame;
(c) an axle pulley fixed on said wheel axle intermediate said pair of drive wheels;
(d) a directional pulley mounted from said main frame generally above and in a spaced apart parallel relationship to said axle pulley;
(e) a directional roller mounted from said main frame in a position intermediate said directional pulley and said axle pulley;
(f) at least one lever arm rotatably associated with said main frame and having an axis of rotation coaxial with that of said directional roller pulley;
(g) an idler roller spaced apart from and below said directional roller intermediate said axle pulley and said directional pulley and mounted on said lever arm at a lower end portion thereof;
(h) a drive belt having an idle condition and an operating condition, which belt in said idle condition is trained about said engine pulley, directional pulley, axle pulley and directional roller and is adjacent said idler roller; and,
(i) means for exerting a pivoting force on said lever arm to pivot said idler roller into engagement with said drive belt thereby increasing the amount of contact said belt has with said axle pulley and place said drive unit in an operating condition.

8. A unit as recited in claim 7 wherein said mower main frame includes a deck and a majority of said drive unit is located above said deck to protect the drive unit from hazard.

9. A unit as recited in claim 7 wherein said drive pulley and said wheel axle are directly connected together by said continuing belt and no interconnecting gear reduction unit is required therebetween.

* * * * *